(12) United States Patent
Baker et al.

(10) Patent No.: US 8,914,553 B2
(45) Date of Patent: *Dec. 16, 2014

(54) MULTIPLE PATH LOAD DISTRIBUTION FOR HOST COMMUNICATION WITH A TAPE STORAGE DEVICE

(71) Applicant: Oracle International Corporation, Redwood City, CA (US)

(72) Inventors: Charles Baker, Conifer, CO (US); Miaohui Zhang, Beijing (CN); Xiao Li, Beijing (CN)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,091

(22) Filed: May 20, 2014

(65) Prior Publication Data

US 2014/0258579 A1  Sep. 11, 2014

Related U.S. Application Data

(63) Continuation of application No. 13/731,497, filed on Dec. 31, 2012, now Pat. No. 8,769,162.

(51) Int. Cl.
   *G06F 11/30* (2006.01)
   *G06F 13/362* (2006.01)
   *G06F 13/00* (2006.01)

(52) U.S. Cl.
   CPC .................................. *G06F 13/362* (2013.01)
   USPC .............................. 710/15; 711/100; 711/156

(58) Field of Classification Search
   CPC ......... G06F 11/00; G06F 11/30; G06F 13/00; G06F 3/00
   USPC ......... 710/15–19, 36; 711/100, 156; 718/105; 714/1
   See application file for complete search history.

(56) References Cited

U.S. PATENT DOCUMENTS

| | | | |
|---|---|---|---|
| 5,937,428 A | 8/1999 | Jantz | |
| 6,029,008 A | 2/2000 | Koyama | |
| 6,044,435 A | 3/2000 | Weissmann | |
| 6,154,852 A | 11/2000 | Amundson et al. | |
| 7,237,056 B2 | 6/2007 | Gold et al. | |
| 7,809,990 B2 * | 10/2010 | Sasaki | 714/42 |
| 2008/0298236 A1 | 12/2008 | Ervin et al. | |
| 2009/0006733 A1 | 1/2009 | Gold et al. | |
| 2010/0235569 A1 | 9/2010 | Nishimoto et al. | |
| 2013/0268693 A1 | 10/2013 | Baker et al. | |

* cited by examiner

*Primary Examiner* — Christopher Shin
(74) *Attorney, Agent, or Firm* — Brooks Kushman P.C.

(57) ABSTRACT

A multiple port host communicates with multiple tape drives by requesting information associated with a particular tape. Information of availability status of a plurality of host ports is provided. Traversing all host initiator ports finds a host port with no or the least traffic load for a tape reservation request. A host port's traffic load calculation uses instant and the updated historical traffic as primary and secondary factors. Every host port's traffic load is updated for every read/write command, and is used for path selection of reservation requests. The instant load is relatively sensitive but will be zero under light load. The historical load is aware of the light load though it is not sensitive enough when a burst I/O occurs. With the traffic load calculated from instant and historical loads, the distribution of tape tasks is spread evenly among host initiator ports under light load and burst I/O scenarios.

4 Claims, 8 Drawing Sheets

MULTIPLE PATH LOAD DISTRIBUTION FOR HOST COMMUNICATION WITH A TAPE STORAGE DEVICE

CROSS-REFERENCE TO RELATED APPLICATIONS

This application is a continuation of U.S. application Ser. No. 13/731,497 filed Dec. 31, 2012, now U.S. Pat. No. 8,769,162 B2, the disclosures of which is hereby incorporated in their entirety by reference herein.

TECHNICAL FIELD

Various embodiments relate to load distribution across multiple communication paths between a host and a tape storage device.

BACKGROUND

When a host is communicating with tape on an open storage area network (SAN), each tape drive may be accessible through multiple initiator ports of the host. If multiple, simultaneous tape input/output (I/O) operations are being performed, the System Administrator chooses which host initiator port to access which tape drive.

DEFINITION OF TERMS

Instant traffic load: The current load of each host initiator port. It is represented by a per host port count of outgoing operations. The value of host port count is the number of read/write operations which are sent to target but not completed. It is updated for every read/write operation issued and completed.

Cumulative traffic load: The incremental cumulative traffic of each host initiator port since system boot up. It is the summation of all read/write operations' execution time. It is updated for every read/write operation issued and completed.

Cumulative traffic load snapshot: The snapshot of each host initiator port's cumulative traffic load. Every initiator port's snapshot is taken for every predetermined time interval.

Historical load: The recent increased cumulative traffic load of a host initiator port since last snapshot. It is calculated when we need to calculate the combined traffic load of an initiator port.

Traffic load: Or the combined traffic load. It is calculated using instant traffic load as the primary factor, and the historical traffic load as a secondary factor for every host initiator port. It is calculated when we need to find a least busy initiator port.

SUMMARY

According to at least one embodiment, a method for a multiple initiator port host to communicate with multiple tape drives is provided by requesting information associated with a particular tape drive. Information is provided indicative of availability status of a plurality of host initiator ports. It is determined if there is a traffic load on an active host initiator port of the plurality of host initiator ports. The active host initiator port is reserved if there is no traffic load or the least traffic load on the active host initiator port. A traffic load is calculated using instant traffic as the primary factor, and the historical traffic as a secondary factor for all host initiator ports. Instant traffic is defined as the current load for each host initiator port. The driver maintains a cumulative traffic load of all read/write operations for each host initiator port. The historical traffic is derived from the cumulative traffic load for each host initiator port and is calculated based on the difference between the latest cumulative and the last cumulative traffic snapshot. The best path is calculated from a combination of the instant and historical loads.

According to at least one embodiment, a method for a multiple initiator port host to communicate with multiple tape drives is provided by receiving input indicative of read/write operations from at least one tape drive attached via a host initiator port. A host initiator per port count of outgoing operations is increased and a cumulative traffic load is updated for a host initiator port if the read/write operation is accepted by the host initiator port.

According to at least one embodiment, a method for a multiple initiator port host to communicate with multiple tape drives is provided by receiving input indicative of read/write operations from at least one fabric attached tape drive, attached through a host initiator port. Traffic load statistics are updated for the host initiator port after receiving the input indicative of read/write operations. A host port count is decreased. A cumulative traffic load is updated for the host initiator port.

According to at least one embodiment, a method for calculating cumulative traffic loads of a multiple port host in communication with multiple tape drives is provided by creating a snapshot for every host port. For a given, predetermined time interval, a snapshot will be created for every host port's cumulative traffic load. A host port's historical traffic load can be derived by calculating the incremental traffic between the latest cumulative traffic and last cumulative traffic snapshot.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
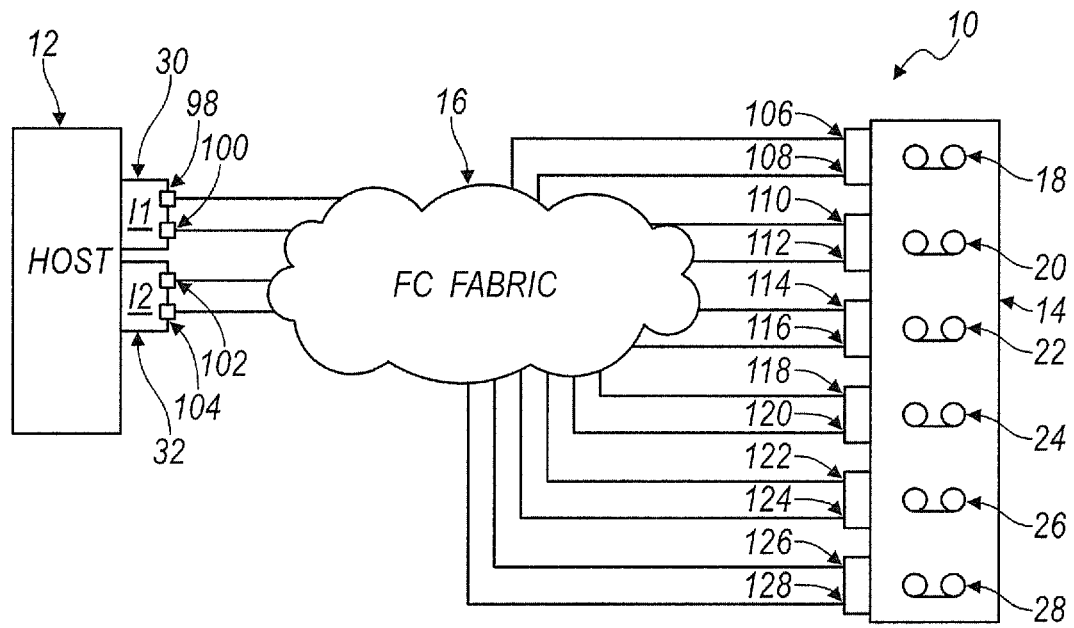
FIG. 1 is a schematic illustration of a prior art communication system between a host and a tape drive system.

Referring now to FIG. 1, a prior art communication system 10 between a host 12 and a data storage system 14 is illustrated. The host 12 may be a controller or a module that requests information from the data storage 14, which, in this system 10, is a tape drive system 14. The host 12 communicates with the tape drive system 14 through a SAN, such as a fibre channel fabric 16. The tape drive system 14 includes a plurality of tape drives 18, 20, 22, 24, 26, 28 in communication with the fibre channel fabric 16. As is known in the art, the tape drive system 14 includes a library for access to stored data in the tape library via read/write operations performed by the tape drives 18, 20, 22, 24, 26, 28. The host 12 includes a plurality of host bus adapters (HBA) 30, 32, each having a pair of initiator ports 98, 100, 102, 104 also in communication with the fibre channel fabric 16.

Due to the serial specifications of tape, port reservations are required for all tape I/O operations. For that reason, a multi-pathing solution for tape cannot follow solutions designed for disk storage. As discussed above, when the host 12 is communicating with tape on a SAN, each tape drive 18, 20, 22, 24, 26, 28 may be accessible through the multiple initiator ports 98, 100, 102, 104 of the host 12. If multiple, simultaneous tape input/output (I/O) operations are being performed, the System Administrator chooses which host initiator port 98, 100, 102, 104 to access which tape drive 18, 20, 22, 24, 26, 28. Due to human error and timing, path selection by the System Administrator may not produce optimal throughput.

FIG. 1 depicts an example of port 98, 100, 102, 104 to tape drive 18, 20, 22, 24, 26, 28 relationships. The system 10 depicted can effectively access forty-eight tape drive paths. That is, each of the six tape drives 18, 20, 22, 24, 26, 28 has two target ports 106, 108, 110, 112, 114, 116, 118, 120, 122, 124, 126, 128 accessible independently on each of the four initiator ports 98, 100, 102, 104. This standard configuration requires the administrator to choose each port to drive connection. The selection method is error prone and may not provide optimal throughput. Depending on the size of the tape fibre channel fabric 16, the tape drive 18, 20, 22, 24, 26, 28 ports 98, 100, 102, 104 selection operation can be very time intensive.

Figure 2:
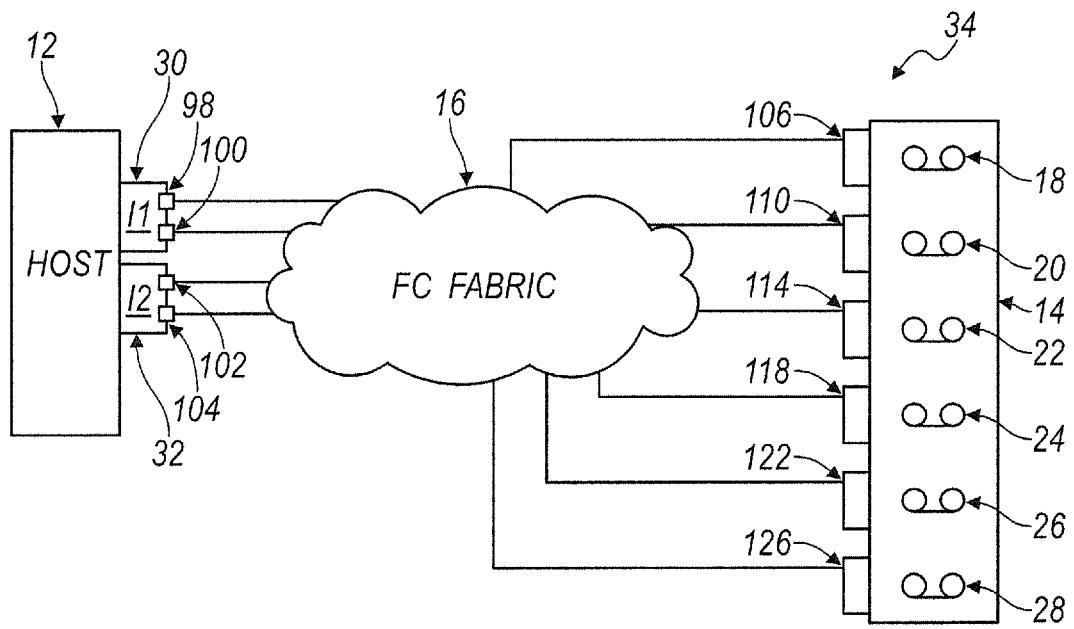
FIG. 2 is a schematic illustration of another communication system illustrating zoning of the communication system.

Referring now to FIG. 2, a communication system 34 with fibre-channel switch zoning may be employed to eliminate multiple paths to a specific tape drive 18, 20, 22, 24, 26, 28. The zoning system 34 establishes a single path to any given tape drive 18, 20, 22, 24, 26, 28. Zoning does not allow dynamic selection for a given I/O stream. Due to tape reservation requirements, dynamic selection for a given I/O stream cannot occur. When the number of tape drives 18, 20, 22, 24, 26, 28 exceeds the number of fibre channel initiator ports 98, 100, 102, 104 on the host 12, I/O delays, or congesting "bottle-necks" occur.

Figure 3:
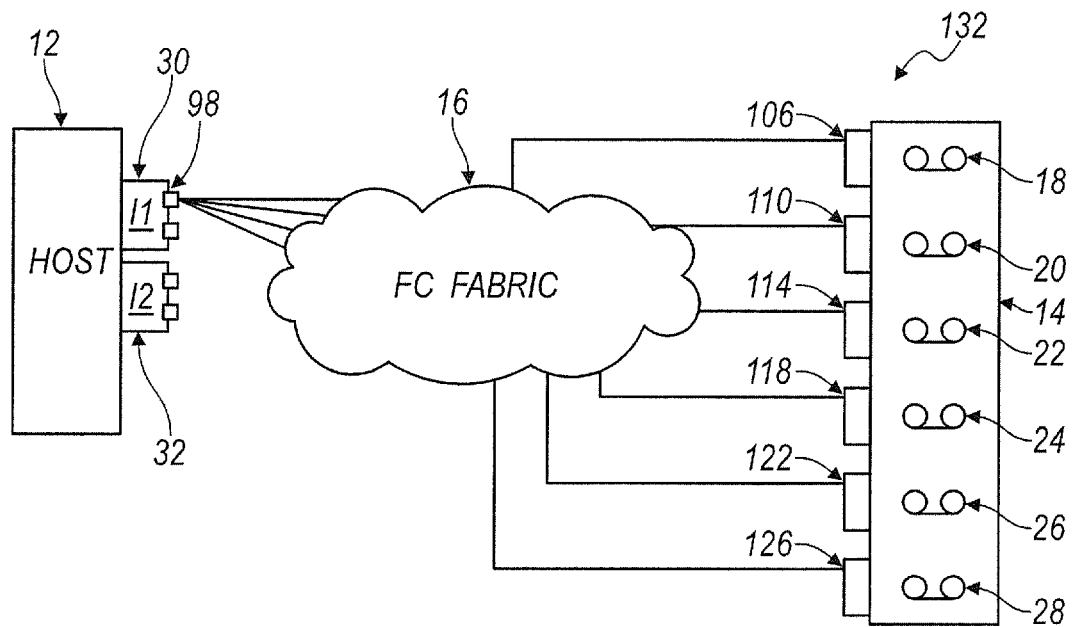
FIG. 3 is a schematic illustration of another communication system illustrating congestion of the communication system.

Another option is the use of multi-pathing software. The multi-pathing solution on tape does not allow I/O on more than a single initiator port 98, so optimal throughput is not obtainable. In FIG. 3, the current multi-pathing solution depicts all six drives 18, 20, 22, 24, 26, 28 attached to a single initiator port 98. When multipath tape is deployed, the drive enumeration attaches to the first port discovered; and the first port discovered is usually a single initiator port 98. FIG. 3 illustrates a communication system 132 schematically with the fibre channel fabric 16 to illustrate potential reservation congestion that is permitted by this system 132, with six tape drives 18, 20, 22, 24, 26, 28 attempting to concurrently communicate with one initiator port 98. The congestion inefficiently employs the resources of the system 132.

Figure 4:
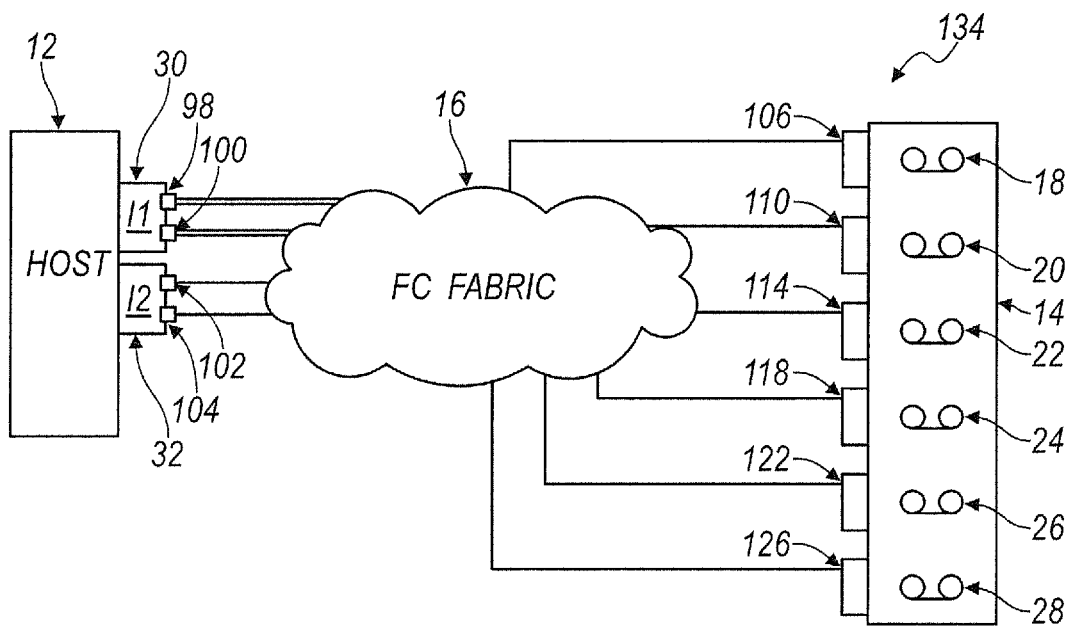
FIG. 4 is a schematic illustration of another communication system illustrating multiple reservations of the communication system.

With reference now to FIG. 4, a communication system 134 is depicted employing an algorithm for providing reservations. The algorithm eases administration and addresses the bottle-necks encountered when performing multiple simultaneous tape I/O and provides a dynamic reservation system 134. The module to support the algorithm may be a multi-pathing kernel module, such as mpxio. Initiator port 98 is attached to drives 18, 26. Initiator port 100 is attached to drives 20, 28. In at least one embodiment, the module is provided within one of the HBAs 30, 32. Alternatively, the module can be provided within the host or any controller; each of which may generally include any number of microprocessors, ASICs, ICs, memory (e.g., FLASH, ROM, RAM, EPROM, and/or EEPROM) which co-act with software code to perform the operations of the HBAs 30, 32. Alternatively, a module is provided within each HBA 30, 32. Of course, any number of modules can be utilized at any location(s) within the system 134.

When a tape I/O request has been made, the module chooses an unused initiator port 98, 100, 102, 104 under the algorithm. If all the initiator ports 98, 100, 102, 104 are in use, the module chooses an initiator port under the algorithm that can best handle the additional load. Every tape task reserves a path and then generates I/O through the reserved port 98, 100, 102, 104. The module distributes the reservations evenly across the initiator ports 98, 100, 102, 104 under the algorithm to minimize the congestion illustrated in FIG. 3. The module maintains a reservation counter for every initiator port 98, 100, 102, 104 under the algorithm. Thus, a reservation weight of a path is a reservation count of the associated port 98, 100, 102, 104. When selecting a path for reservation, the module utilizes the algorithm to select a path with a lowest reservation weight. As illustrated in FIG. 4, the module distributes reservation tasks evenly on different initiator ports 98, 100, 102, 104 under the algorithm. The algorithm may be employed as a module at the host.

Figure 5:
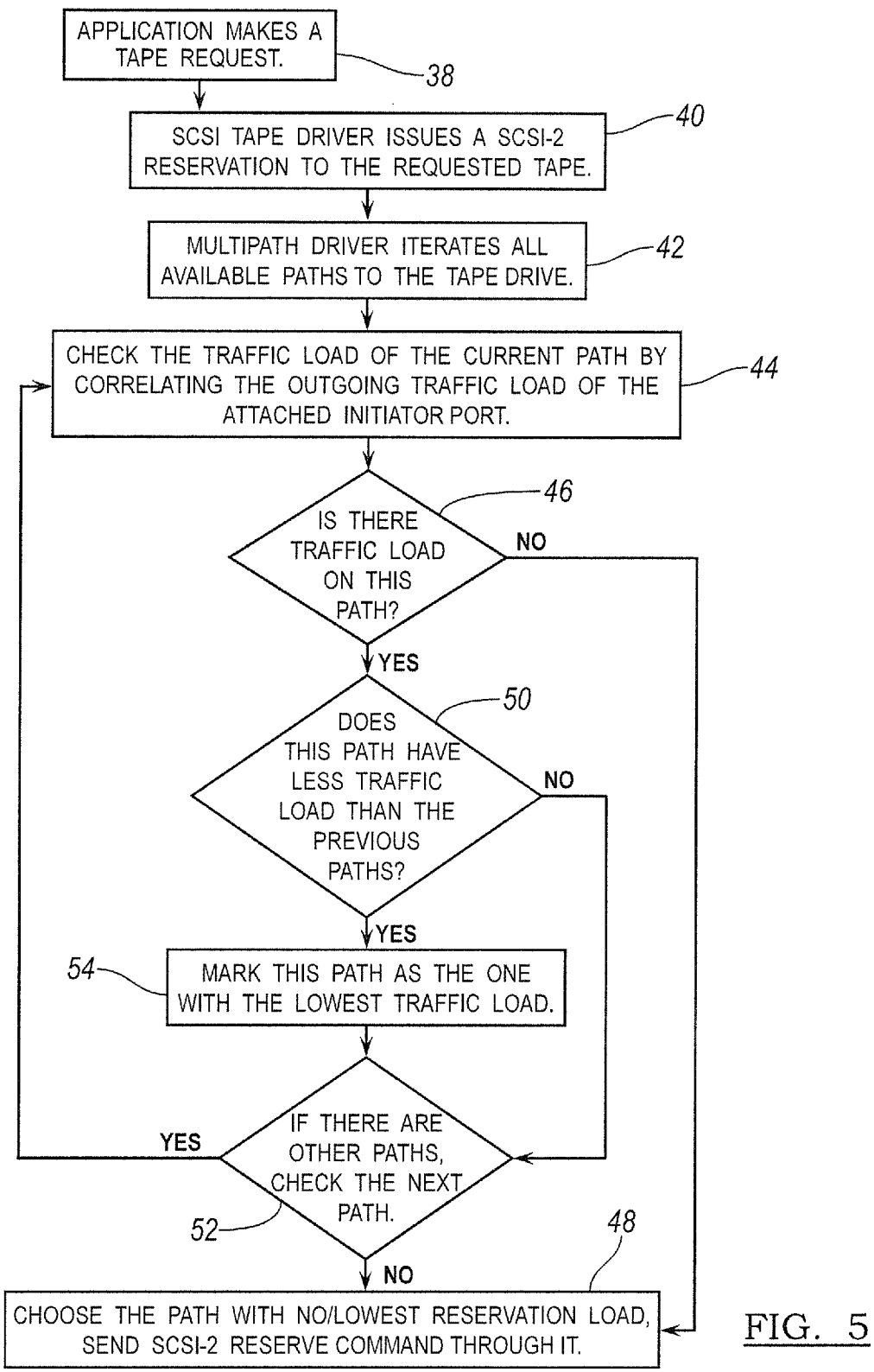
FIG. 5 is a flowchart of a method for a multiple port host to communicate with multiple tape drives according to an embodiment.

Referring now to FIG. 5 an embodiment of the algorithm is represented as a flowchart for port reservations. In other words, the flowchart of FIG. 5 depicts a method for a multiple port host 12 to communicate with multiple tape drives 18, 20, 22, 24, 26, 28. At block 38, the application at the host 12 makes a tape request. At block 40, a small computer system interface (SCSI) tape drive 18, 20, 22, 24, 26, 28 issues a SCSI-2 reservation to the requested tape. A multipath driver iterates all available paths to the associated tape drive 18, 20, 22, 24, 26, 28 at block 42.

At block 44, a traffic load of the active port, such as initiator port 98, is checked by the module. The traffic load is a status of whether the active port 98 is currently communicating with a tape drive 18, 20, 22, 24, 26, 28. A traffic load is also correlated by any outgoing tape operations that will ultimately result in information sent to one of the tape drives 18, 20, 22, 24, 26, 28 to the active host port 98. It is determined by the module at decision block 46 if there is a traffic load on the associated port 98. If there is not a traffic load at the associated port 98, the method progresses to block 48 wherein the port 98 with no traffic load is chosen. Also, at block 48, an SCSI-2 reserve command is sent to the active port 98.

If it is determined by the module that there is a traffic load on the active port 98 at decision block 46, then, at decision block 50, it is determined whether the active port 98 has a traffic load less than previously tested ports. If the active port 98 does not have a lower traffic load than previously tested ports, then the module progresses to decision block 52 according to the method. However, since active port 98 is the first port 98, it is marked by the module as having the lowest traffic load at block 54 before proceeding to decision block 52. At decision block 52, the module determines if there are other ports 100, 102, 104. If there are other ports 100, 102, 104, the next port 100 is checked at block 44 under the algorithm.

If port 100 does not have a traffic load at decision block 46 then port 100 is reserved at block 48 by the module. If port 100 does have a traffic load, the traffic load of port 100 is compared by the module to port 98 at decision block 50. If the port 100 has a lower traffic load than previous port 98, then port 100 is marked by the module as the lowest traffic load at block 54. If port 100 does not have a lower traffic load, then decision block 52 is repeated, wherein the next port 102 is checked and block 44 is repeated. At decision block 46 if port 102 does not have a traffic load, then port 102 is reserved by the module at block 48. Otherwise, port 102 is compared to the previous ports 98, 100 at decision block 50. If port 102 has a lower traffic load, then port 102 is marked as the lowest traffic load at block 54. Otherwise, decision block 52 checks if there are any other ports 104 beyond port 102, and then the port with the lowest traffic load is reserved at block 48 according to the algorithm.

At decision block 50, whichever port 98, 100, 102, 104 has the lowest traffic load when checked as the current port, the port 98, 100, 102, 104 is then marked by the module as having the lowest traffic load at block 54. Then at block 52 the module determines if there are other paths. If the active port 104 is the last port 104, then there are no other paths, and the module progresses to block 48 wherein the port 98, 100, 102, 104 that was marked as having the lowest traffic load at block 54 is reserved.

Figure 6:
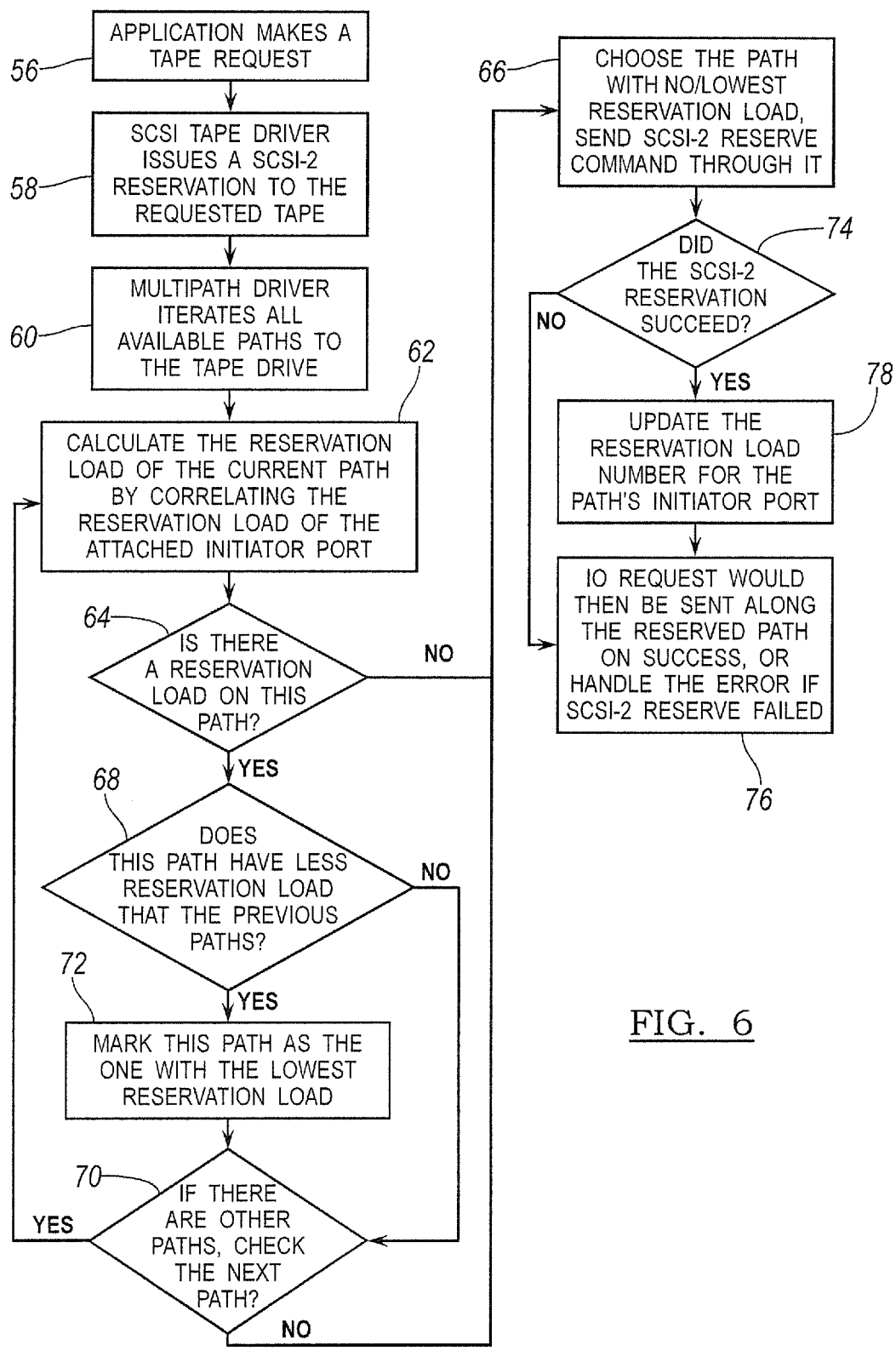
FIG. 6 is a flowchart of a method for a multiple port host to communicate with multiple tape drives according to another embodiment.

Referring now to FIG. 6 another embodiment of the algorithm is represented as a flowchart for port reservations performed by the module communicating with the HBA. In other words, the flowchart of FIG. 6 depicts a method for a multiple port host 12 to communicate with multiple tape drives 18, 20, 22, 24, 26, 28. At block 56, the application at the host 12 makes a tape request. At block 58, a SCSI tape drive 18, 20, 22, 24, 26, 28 issues an SCSI-2 reservation to the requested tape. A multipath driver iterates all available paths to the associated tape drive 18, 20, 22, 24, 26, 28 at block 60.

At block 62, a reservation load of the active port, such as initiator port 98, is calculated by the module. The reservation load is a status of whether the active port 98 has any pending reservations with tape drives 18, 20, 22, 24, 26, 28. It is determined by the module at decision block 64 if there is a reservation load on the associated port 98. If there is not a reservation load at the associated port 98, the module progresses to block 66 wherein the port 98 with no reservation load is chosen according to the method. Also, at block 66, a SCSI-2 reserve command is sent to the active port 98.

If it is determined by the module that there is a reservation load on the active port 98 at decision block 64, then, at decision block 68, it is determined by the module whether the active port 98 has a reservation load less than previously tested ports. If the active port 98 does not have a lower reservation load than previously tested ports, then the module progresses to decision block 70 under the algorithm. However, since active port 98 is the first port 98, it is marked as having the lowest reservation load at block 72 before proceeding to decision block 70. At decision block 70, it is determined by the module if there are other ports 100, 102, 104. If there are other ports 100, 102, 104, the next port 100 is checked by the module at block 62.

If port 100 does not have a reservation load at decision block 64 then port 100 is reserved by the module at block 66. If port 100 does have a reservation load, the reservation load of port 100 is compared by the module to port 98 at decision block 68. If the port 100 has a lower reservation load than previous port 98, then port 100 is marked as the lowest reservation load at block 72. If port 100 does not have a lower reservation load, then decision block 70 is repeated, wherein the next port 102 is checked by the module and block 44 is repeated. At decision block 64, if port 102 does not have a reservation load, then port 102 is reserved at block 66. Otherwise, port 102 is compared by the module to the previous ports 98, 100 at decision block 68. If port 102 has a lower reservation load, port 102 is marked as the lowest reservation load at block 72. Otherwise, at decision block 70 the module checks if there are any other ports 104 beyond port 102, and then the port with the lowest traffic load is reserved at block 66.

At decision block 68, whichever port 98, 100, 102, 104 has the lowest reservation load when checked as the current port, the port 98, 100, 102, 104 is then marked by the module as having the lowest reservation load at block 72. Then at block 70, the module determines if there are other paths. If the active port 104 is the last port 104, then there are no other paths, and the module progresses the method to block 66 wherein the port 98, 100, 102, 104 that was marked as having the lowest reservation load at block 54 is reserved.

At decision block 74, the module determines if the reservation succeeded. If not, the error is handled at block 76. If the reservation succeeded, a reservation load number is updated at block 78, and then an I/O request is sent by the module along the reserved path at block 76.

Figure 7:
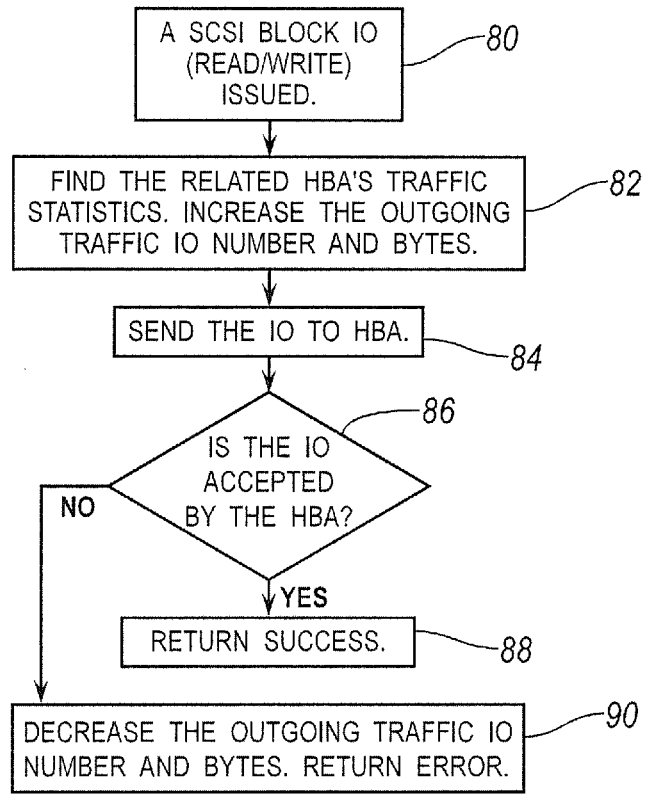
FIG. 7 is a flowchart of a method for a multiple port host to communicate with multiple tape drives according to yet another embodiment.

FIG. 7 illustrates an outgoing traffic load maintenance flow chart performed by the module. At block 80, a SCSI block I/O (read/write command) is issued by the module. At block 82, traffic statistics of the HBA of the host 12 are found. The outgoing traffic I/O number and the bytes are increased. At block 84, the I/O is sent to the HBA. At decision block 86, it is determined if the I/O is accepted by the HBA. If so, a success command is returned in block 88. If not, the outgoing traffic I/O number is decreased in block 90; and an error is returned.

Figure 8:
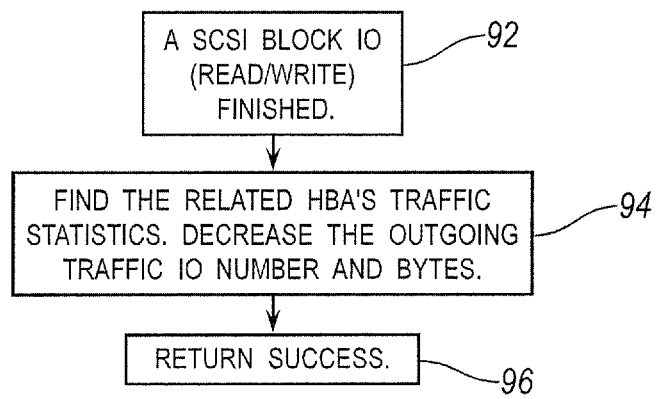
FIG. 8 is a flowchart of a method for a multiple port host to communicate with multiple tape drives according to another embodiment.

FIG. 8 illustrates another outgoing traffic load maintenance flow chart performed by the module. At block 92, a SCSI block I/O (read/write communication) is finished. At block 94, the HBA's traffic statistics are found. The outgoing traffic I/O number and bytes are decreased. At block 96, success information is returned.

A performance test was conducted based on a prototype, for determining performance gain in a host with concurrent tape tasks. An i86pc host was employed with six host initiator ports, four of which were two Gigabits (Gb), and two were four Gb. Five tape drives with five tapes were utilized. Each I/O task used a one Gb file. The test was conducted with one, three and five tasks with the prior art system 10, and the reservation system 134 utilizing the algorithm(s). The empirical data from the test is illustrated below in Table 1.

TABLE 1

Performance Test Results

| Concurrent task number | Prior art average time per task | Algorithm average time per task | Performance gain |
|---|---|---|---|
| 1 task | round1: 289.43 s | round1: 271.98 s | 2.22% |
| | round2: 271.91 s | round2: 271.86 s | |
| | round3: 289.76 s | round3: 288.81 s | |
| 3 tasks | round1: 375.75 s | round1: 308.11 s | 23.10% |
| | round2: 377.10 s | round2: 306.52 s | |
| | round3: 378.17 s | round3: 304.49 s | |
| 5 tasks | round1: 529.62 s | round1: 352.80 s | 54.00% |
| | round2: 531.02 s | round2: 343.03 s | |
| | round3: 531.40 s | round3: 338.26 s | |

If only a single tape drive is in use, these changes have minimal advantage over the prior art, unless tape multi-pathing is in use. When tape multi-pathing is employed, an improvement will be seen with a single I/O stream. It is when multiple, simultaneous I/O is underway, that this solution will show a performance advantage. The system 134 eliminates the need for the administrator to choose the tape reservation path, and allows multi-pathing to use more than a single initiator port. Less time may be required for storing and retrieving data from a data storage device.

Multi-pathing use load-balancing to utilize multiple paths efficiently. Taking path quality into account, results in a significant performance gain. Static quality is one attribute of multi-pathing which is defined at path creation time, e.g. bandwidth, statistical analysis system (SAS) expander hop count, and the like. A path life cycle changes dynamically based on I/O load, linkage status, and the like; and therefore difficult to predict its dynamic state. From a multi-pathing standpoint, there are at least three measurements related to path quality: initiator port, transport fabric, and target port. Dynamic, multi-pathing capabilities of the initiator port take into account: per-initiator port quality and per-path quality (mapped to transport fabric and target port quality).

Dynamic optimization enhances multi-path performance. SCSI reservations can be distributed evenly among multiple initiator ports 98, 100, 102, 104. As shown in FIG. 4 and expanded in FIG. 9, if the system 134 receives a new tape I/O request, initiator port 102, which has the lowest port load statistic of ten percent, is selected because it is the port with the least traffic load.

Figure 9:
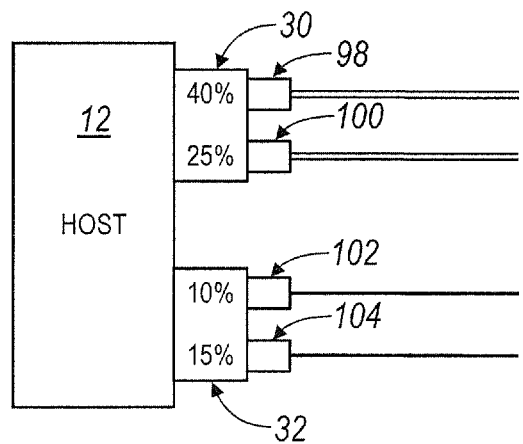
FIG. 9 is a schematic illustration of another communication system illustrating statistics of the communication system.

This selection process can be performed by creating traffic statistics for each initiator port 98, 100, 102, 104 as illustrated in FIG. 9. The traffic statistics may be updated, for example, when I/O is started and when I/O is completed. When selecting a path for a SCSI reservation command, a path is selected attached to the initiator port 102 with the least I/O load.

Figure 10:
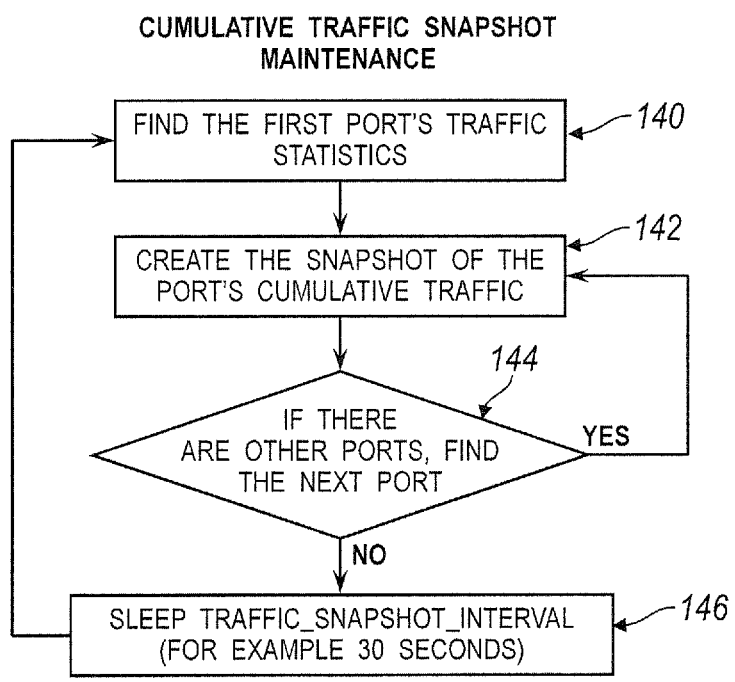
FIG. 10 is a flowchart of a method for a multiple port host to communicate with multiple tape drives according to another embodiment.

FIG. 10 illustrates a method for recording traffic loads of a multiple initiator port host in communication with multiple tape drives. At block 140, the traffic statistics for the first initiator port 98 are found. At block 142, a snapshot is created for cumulative traffic of the initiator port 98. At decision block 144, it is determined if there are other ports, such as ports 100, 102, 104. If so, block 142 is repeated. Once there are no further ports 100, 102, 104, proceed to block 146, a sleep interval is performed before repeating the method. For the example of FIG. 10, the sleep interval is set at 30 seconds for recording a snapshot of cumulative traffic at regular intervals.

Figure 11:
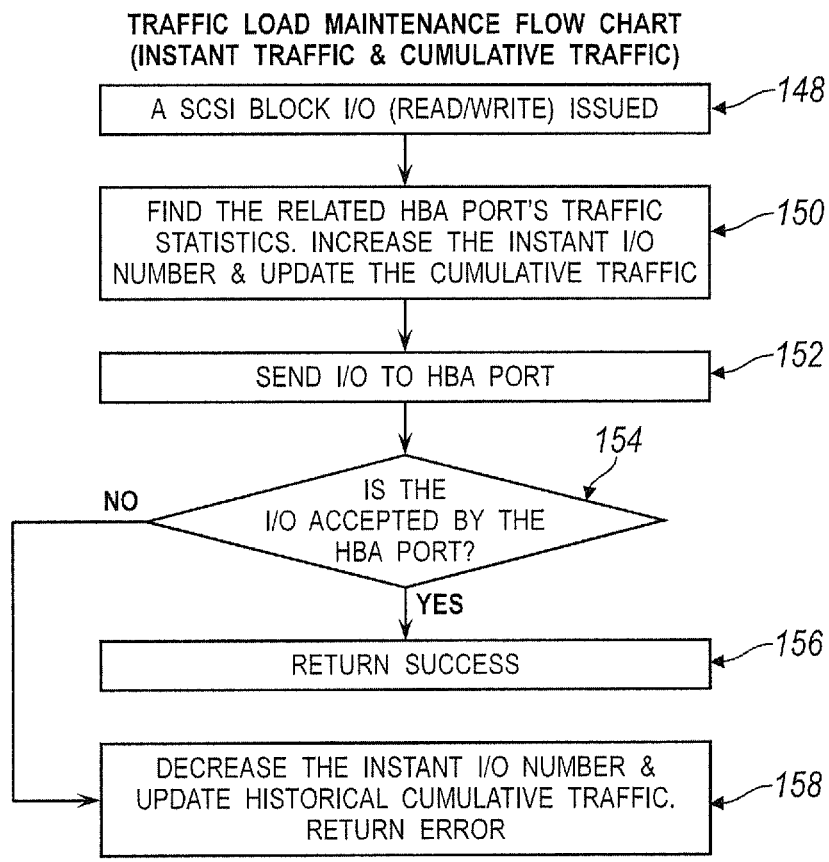
FIG. 11 is a flowchart of a method for a multiple port host to communicate with multiple tape drives according to another embodiment.

FIG. 11 illustrates an outgoing traffic load maintenance flow chart performed by the module. At block 148, a SCSI block I/O (read/write command) is issued by the module. At block 150, traffic statistics of HBA 30, initiator port 98 of the host 12 are found. The outgoing traffic I/O number is increased. The cumulative traffic is also increased. At block 152, the I/O is sent to the HBA 30, initiator port 98. At decision block 154, it is determined if the I/O is accepted by the HBA 30, initiator port 98. If so, a success command is returned in block 156. If not, the outgoing traffic I/O number is decreased in block 158; and the cumulative traffic is updated. Additionally, an error is returned.

Figure 12:
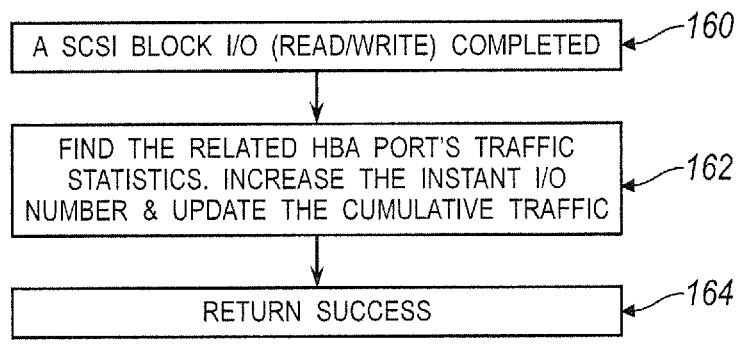
FIG. 12 is a flowchart of a method for a multiple port host to communicate with multiple tape drives according to another embodiment.

FIG. 12 illustrates another outgoing traffic load maintenance flow chart performed by the module. At block 160, an SCSI block I/O (read/write communication) is finished. At block 162, the HBA port's traffic statistics are found. The outgoing traffic I/O number is decreased; and the cumulative traffic is updated. At block 164, success information is returned.

Figure 13:
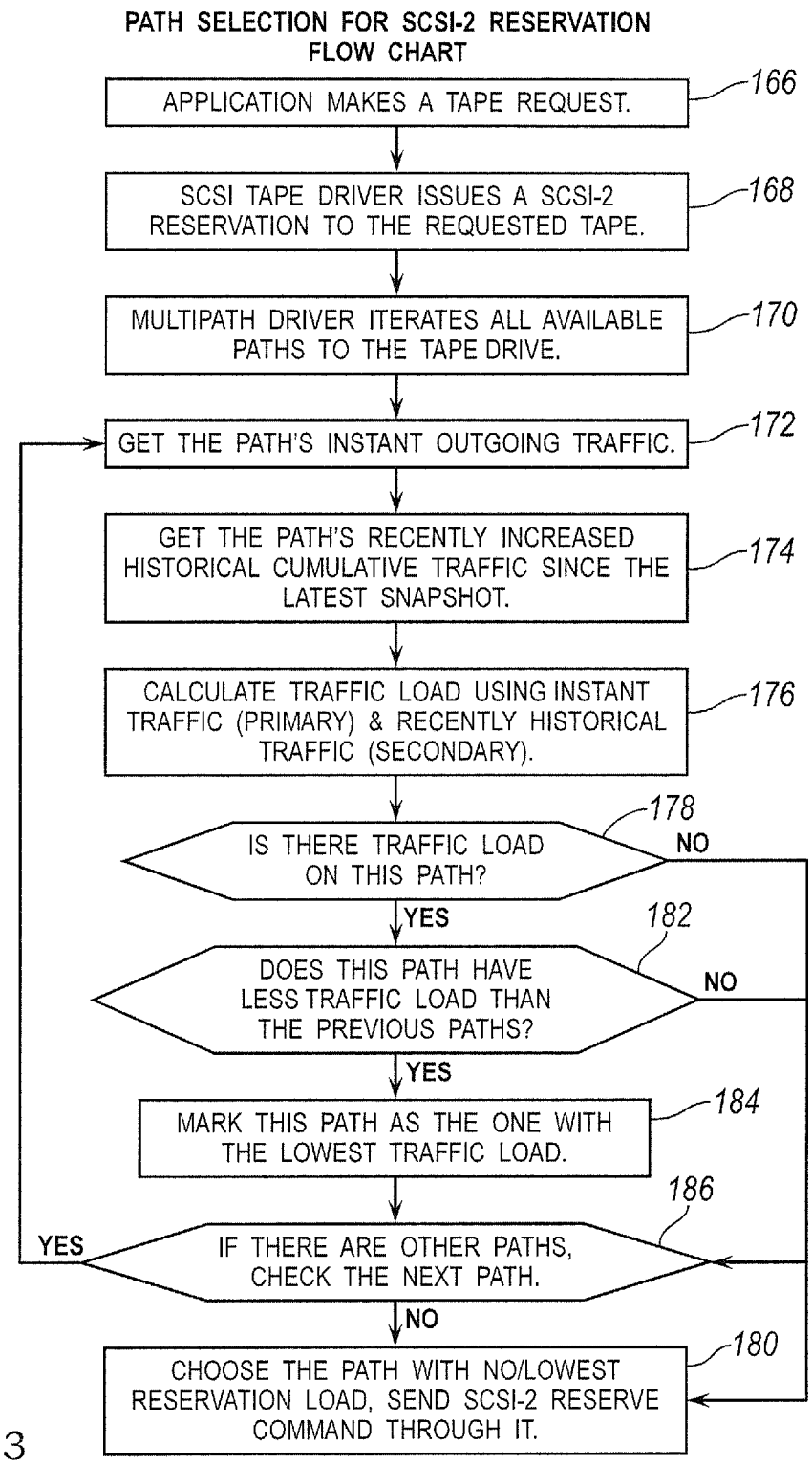
FIG. 13 is a flowchart of a method for a multiple port host to communicate with multiple tape drives according to another embodiment.

Referring now to FIG. 13 another embodiment of an algorithm is represented as a flowchart for port reservations performed by the module communicating with HBA 30. In other words, the flowchart of FIG. 13 depicts a method for the multiple port host 12 to communicate with multiple tape drives 18, 20, 22, 24, 26, 28. At block 166, the application at the host 12 makes a tape request. At block 168, the SCSI tape driver issues a SCSI-2 reservation to the requested tape. A multipath driver iterates all available paths to the associated tape drive 18, 20, 22, 24, 26, 28 at block 170.

At block 172, the path's instant outgoing traffic is retrieved. In other words, it is determined whether the path currently has I/O traffic. At block 174, the path's recently increased cumulative traffic is retrieved since the latest snapshot. At block 176, a traffic load is calculated using instant traffic as a primary factor, and the recently increased historical traffic as a secondary factor.

It is determined by the module at decision block 178 if there is a traffic load on the associated path, such as port 98. If there is not a traffic load at the associated path, the module progresses to block 180 wherein the port 98 with no traffic load is chosen according to the method. Also, at block 180, a SCSI-2 reserve command is sent to the active port 98.

If it is determined by the module that there is a traffic load on the active port 98 at decision block 178, then, at decision block 182, it is determined by the module whether the active port 98 has a traffic load less than previously tested ports. If the active port 98 does not have a lower traffic load than previously tested ports, then the module progresses to decision block 186 under the algorithm; and the path with the lowest traffic load is selected. However, since active port 98 is the first port 98, it is marked as having the lowest traffic load at block 184 before proceeding to decision block 186. At decision block 186, it is determined by the module if there are other ports 100, 102, 104. If there are other ports 100, 102, 104, the next port 100 is checked by the module at block 172.

If port 100 does not have a traffic load at decision block 178 then port 100 is reserved by the module at block 180. If port 100 does have a traffic load, the traffic load of port 100 is compared by the module to port 98 at decision block 182. If the port 100 has a lower reservation load than previous port 98, then port 100 is marked as the lowest traffic load at block 184. If port 100 does not have a lower traffic load, then decision block 186 is repeated, wherein the next port 102 is checked by the module and block 172 is repeated. At decision block 178, if port 102 does not have a traffic load, then port 102 is reserved at block 180. Otherwise, port 102 is compared by the module to the previous ports 98, 100 at decision block 182. If port 102 has a lower traffic load, port 102 is marked as the lowest traffic load at block 184. At decision block 186 the module checks if there are any other ports 104 beyond port 102, and the steps are repeated beginning at block 172.

At decision block 182, whichever port 98, 100, 102, 104 has the lowest traffic load when checked as the current port, the port 98, 100, 102, 104 is then marked by the module as having the lowest traffic load at block 184. Then at block 186, the module determines if there are other paths. If the active port 104 is the last port 104, then there are no other paths, and the module progresses the method to block 180 wherein the port 98, 100, 102, 104 that was marked as having the lowest reservation load at block 184 is reserved.

Cumulative traffic data is collected and used as part of the path selection process in the method of FIG. 13. The traffic load measurement is enhanced in this method. Both instant load and latest historical load are used to represent an initiator port's load. The instant load is sensitive enough but will be zero most of the time when load is light, while the latest historical load can be aware of the light load though it is not sensitive enough when a burst I/O occurs.

The combination of instant load (as primary) and the latest historical load (as secondary) are used to represent an initiator port's load. When the load is light, all the initiator ports' instant load is zero most of the time. If a new tape task is initiated, it can use latest historical load to find a least busy initiator port. When burst I/O occurs, latest historical load cannot represent the load change in short time, but instant load can be used to spread the tape tasks evenly among the initiator ports.

When multiple, simultaneous I/O is underway, this solution provides a performance advantage. It also eliminates the need for the administrator to choose the tape reservation path, and allows multi-pathing to use more than a single initiator port.

This method provides for load balancing, which looks at port statistics to improve throughput over industry standards. The method greatly reduces the amount of time necessary for the System Administrator to design, configure and implement a manual tape load distribution system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for recording traffic loads of a multiple port host in communication with multiple tape drives, the method comprising:
   determining an instant traffic load for each host port of a plurality of host ports on a first host bus adaptor;
   obtaining a historical traffic load for each host port on the first host bus adaptor;
   calculating a cumulative traffic load for each host port on the first host bus adaptor; and
   recording the cumulative traffic load of the first host bus adaptor.

2. The method of claim 1 further comprising:
   waiting a predetermined time; and
   repeating the preceeding steps.

3. The method of claim 1 further comprising:
   determining if there are any other host bus adaptors;
   waiting a predetermined time in response to a determination that there are not other host bus adaptors; and
   repeating the preceeding steps.

4. The method of claim 1 further comprising:
   determining if there are any other host bus adaptors;
   determining an instant traffic load for each host port of a plurality of host ports on a second host bus adaptor;
   obtaining a historical traffic load for each host port on the second host bus adaptor;
   calculating a cumulative traffic load for each host port on the second host bus adaptor; and
   recording the cumulative traffic load of the second host bus adaptor.

* * * * *

UNITED STATES PATENT AND TRADEMARK OFFICE
CERTIFICATE OF CORRECTION

| | | |
|---|---|---|
| PATENT NO. | : 8,914,553 B2 | Page 1 of 1 |
| APPLICATION NO. | : 14/282091 | |
| DATED | : December 16, 2014 | |
| INVENTOR(S) | : Baker et al. | |

It is certified that error appears in the above-identified patent and that said Letters Patent is hereby corrected as shown below:

In the Specification

In column 1, line 10, delete "disclosures" and insert -- disclosure --, therefor.

In the Claims

In column 10, line 25, in Claim 2, delete "preceeding" and insert -- preceding --, therefor.

In column 10, line 30, in Claim 3, delete "preceeding" and insert -- preceding --, therefor.

Signed and Sealed this
Fourth Day of August, 2015

Michelle K. Lee
*Director of the United States Patent and Trademark Office*